United States Patent
Faccin et al.

(10) Patent No.: US 7,489,667 B2
(45) Date of Patent: Feb. 10, 2009

(54) DYNAMIC RE-ROUTING OF MOBILE NODE SUPPORT IN HOME SERVERS

(76) Inventors: Stefano M. Faccin, 3421 Dartmoor Dr., Dallas, TX (US) 75229-2622; Hannu Flinck, 755 Crestmoor Ct., San Jose, CA (US) 95129

( * ) Notice: Subject to any disclaimer, the term of this patent is extended or adjusted under 35 U.S.C. 154(b) by 1018 days.

(21) Appl. No.: 10/290,490

(22) Filed: Nov. 8, 2002

(65) Prior Publication Data

US 2004/0090941 A1 May 13, 2004

(51) Int. Cl.
*H04Q 7/24* (2006.01)
(52) U.S. Cl. .................. 370/338; 370/352; 370/356; 370/395.52; 455/432.1; 455/433
(58) Field of Classification Search .......... 370/338, 370/352, 356, 395.52, 401, 331, 329, 528; 455/432.1, 433, 435
See application file for complete search history.

(56) References Cited

U.S. PATENT DOCUMENTS

| | | | | |
|---|---|---|---|---|
| 5,572,528 | A * | 11/1996 | Shuen | 370/402 |
| 6,418,130 | B1 | 7/2002 | Gustav et al. | |
| 6,578,085 | B1 * | 6/2003 | Khalil et al. | 709/241 |
| 6,850,532 | B2 * | 2/2005 | Thubert et al. | 370/401 |
| 6,859,448 | B1 * | 2/2005 | Roy | 370/338 |
| 6,907,033 | B2 * | 6/2005 | Faccin | 370/352 |
| 6,967,941 | B2 * | 11/2005 | Roy | 370/338 |
| 6,973,086 | B2 * | 12/2005 | Patil et al. | 370/392 |
| 6,987,771 | B2 * | 1/2006 | Shimizu et al. | 370/401 |
| 6,990,086 | B1 * | 1/2006 | Holur et al. | 370/329 |
| 7,023,828 | B2 * | 4/2006 | Korus et al. | 370/338 |
| 7,203,175 | B2 * | 4/2007 | Thubert et al. | 370/254 |
| 7,203,837 | B2 * | 4/2007 | O'Shea et al. | 713/170 |
| 2001/0030952 | A1 * | 10/2001 | Roy | 370/329 |
| 2001/0046223 | A1 * | 11/2001 | Malki et al. | 370/338 |

(Continued)

FOREIGN PATENT DOCUMENTS

EP 1134991 A 9/2001

OTHER PUBLICATIONS

Johnson et al., "Mobility Support in IPv6." Internal draft version 18, IEFT, Jun. 1, 2002, p. 1-168. (http://tools.ietf.org/html/draft-ietf-mobileip-ipv6-18).
Perkins, "Mobile IP." IEEE Communications Magazine, May 1997, p. 84-99.
International Search Report mailed Jun. 16, 2004 for PCT/IB2003/004979.

*Primary Examiner*—CongVan Tran

(57) ABSTRACT

The present invention discloses performing a care of address registration of a mobile node at a home server unit of a home network of the mobile node, the home network comprising a plurality of home server units being arranged to maintain a binding between a home address of a mobile node and its current care of address from a visited network. A mobile node selects a first home server unit for registration and sends a binding update message to the first home server unit. In response to the received binding update message the first home server unit decides whether a binding update is to be rejected. In case it is decided that the binding update is to be rejected, the first home server unit selects a second home server unit. In a binding acknowledgment message information about the second home server unit is included and a binding update at the second home server unit is confirmed. The binding acknowledgment message resulting therefrom is sent to the mobile node.

23 Claims, 2 Drawing Sheets

U.S. PATENT DOCUMENTS

2002/0067704 A1 6/2002 Ton
2003/0093553 A1* 5/2003 Le et al. .................... 709/238
2004/0090942 A1* 5/2004 Flinck ....................... 370/338
2006/0182083 A1* 8/2006 Nakata et al. ............... 370/352

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Option Type  | Option Length |                                |
+-+-+-+-+-+-+-+-+-+-+-+-+-+-+-+-+-   -   -   -   -              |
|                                                                |
|                    Alternative HA Address                      |
|                                                                |
|                                                                |
|                -   -   -   -  -+-+-+-+-+-+-+-+-+-+-+-+-+-+-+-+-+
```

DYNAMIC RE-ROUTING OF MOBILE NODE SUPPORT IN HOME SERVERS

FIELD OF THE INVENTION

In general, the present invention relates to IP (Internet Protocol) networks and is applicable in any network in which a protocol such as mobile IPv4 (Internet Protocol version 4) or mobile IPv6 is used to support the mobility of a user at the IP level, for example inter-access mobility in UMTS-WLAN (Universal Mobile Telecommunication System-Wireless Local Area Network) networks and intra-access but inter-access network mobility for operator's WLAN networks.

In particular, the present invention relates to performing a care of address registration of a mobile node at a home server of a home network of the mobile node, for example in accordance with mobile IPv6 protocol, the home network comprising a plurality of home servers being arranged to maintain a binding between a home address of a mobile node and its current care of address in a visited network.

BACKGROUND OF THE INVENTION

Mobile IP has a functionality for maintaining an association between a home address of a mobile node and its current topologically correct care of address from a visited network. For example, in mobile IPv6 protocol this functionality is called home agent which maintains the association, also known as a binding, between the home address of the mobile node and its current topologically correct care of address from the visited network. This functionality is described by D. Johnson, C. Perkins, J. Arkko in "Mobility Support in IPv6", Internet Draft version 18, Internet Engineering Task Force, Jun. 1, 2002, which document is referred to as reference (1) hereafter.

The home agent resides typically in the home network from where the mobile node has configured its "static" home address that is advertised through the DNS (Domain Name Server) system and that provides global reachability for correspondent nodes. Reference (1) mandates for the primary care of address registration a sequence of verifications to be performed for a binding update message before the registration can be accepted. According to mobile IPv4 protocol, the binding update message is a registration message.

In reference (1) it is described that the home agent verifies the binding update message, i.e. it checks whether it is a first home agent and whether the home address of the mobile node in the binding update message is an on-link address. Moreover, if the home agent chooses to reject the requested binding update for any other reason, e.g. due to insufficient resources to serve another mobile node as a home agent, then the home agent should return a binding acknowledgment message to the mobile node, in which a status field is set to an appropriate value to indicate the reason for the rejection.

There are several possible scenarios for the deployment of mobile IP in terms of how a mobile node (MN) can identify and locate a home agent (HA) in its home network:

MN performs dynamic HA discovery, i.e. it sends a request to an anycast address in the home network, and more precisely on the home link, and receives a response from an HA willing and capable to serve the MN;

MN is pre-configured, e.g. at subscription time, with the address of one or more HAs that can serve the MN, and the MN will use them according to a priority scheduling determined by a service provider (e.g. use always the first in the list and switch to the second one when the first one is not available, use a round-robin algorithm to select between them, etc.).

In the first scenario, two round trip messages are needed between the MN and the home network to register the MN with the HA and therefore make the MN reachable at the IP level. In general, this procedure can work but the signaling load required may be unacceptable in several situations, e.g. access over a wireless link. Also, the delay involved in this procedure can be significant if the point of attachment of the MN is geographically far from the home network. Moreover, the HA discovery procedure is not secure.

In several deployments, the second scenario (i.e. HA addresses pre-configured in the MN) is more feasible. For example, a similar scenario is already adopted in other frameworks, e.g. to support VPN (Virtual Private Network) the addresses of the VPN gateways are pre-configured in the VPN client.

In this second scenario, the MN sends a binding update message to a primary HA in the list, i.e. the one that should be tried first. In case the HA is not able to serve the MN due to resources limitations, or due to configuration changes in the home network, e.g. the HA address is not valid anymore, as described above, the MN is provided with a reject information. At this point, the MN needs to try with another HA from its home agent list or try to discover a new one with the dynamic home agent discovery mechanism.

If the MN uses its local copy of the Home Agent list, it is likely that this list is stale because the information on the primary HA was also outdated, consequently the same is likely to apply with the other entries. In particular, if the home agents at the home network are using dynamic load balancing based on the advertised preferences there is a considerable possibility that the home agent list at the mobile node is not up to date with the load balancing status of the home network. In addition, even if the list is not outdated, this requires the MN to send a new binding update.

Alternatively, when receiving the reject information, the MN can perform the dynamic home agent discovery. However, this requires a second binding update and round trip of messages between the MN and the HA and introduces an additional delay and extra messaging that might in some cases be harmful. This can happen for example when a home agent at a previous visited link is used for forwarding packets to a new home agent/router at a new link.

According to the prior art, the above-mentioned problem has been solved in that the MN has to perform a dynamic home agent discovery procedure first, and then send a binding update to the HA discovered. However, this requires two round trips between the MN and the HA and can introduce delay.

Alternatively, according to the prior art, when the HA rejects the first binding update which has been sent to the HA according to a pre-configured list in the MN, for example, the MN is forced to perform a dynamic home agent discovery procedure and then send another BU. However, this requires three round trips between the MN and the HA and can introduce even more delay.

SUMMARY OF THE INVENTION

It is an object of the present invention to improve a care of address registration process between a mobile node and a home server.

According to the present invention, this object is achieved by a method of performing a care of address registration using, a home server unit, a mobile node and a communication network as described herein.

Further features of the present invention are defined in the dependent claims.

The present invention describes an enhancement of a binding update procedure to cope with situations where a home server, e.g. a home agent HA, selected by a mobile node MN is not capable to support the MN because the selected HA has insufficient resources, for example, and an alternative HA needs to be selected. The invention allows for a dynamic selection of an alternative home server while not requiring additional round trips of messages between the MN and the home network.

In other words, the invention provides faster recovery from the primary home server or HA being unable to serve the MN, by allowing the binding update procedure to be performed in one single round trip between the MN and the home network. In case of an MN relying on its own copy of the home agent list, the invention circumvents a possible inconsistency problem, and in case of an MN trying to apply dynamic home agent discovery it provides faster HA registration, with less signaling required.

Moreover, according to the present invention only minimal modifications are required to mobile IP versions like IPv6 and IPv4, and mobile IP security is not compromised.

BRIEF DESCRIPTION OF THE DRAWINGS

FIG. 2 shows a diagram illustrating an alternative home agent option according to an embodiment of the present invention, which is associated with a binding acknowledgment message according to mobile IPv6.

DESCRIPTION OF THE INVENTION

Figure 1:
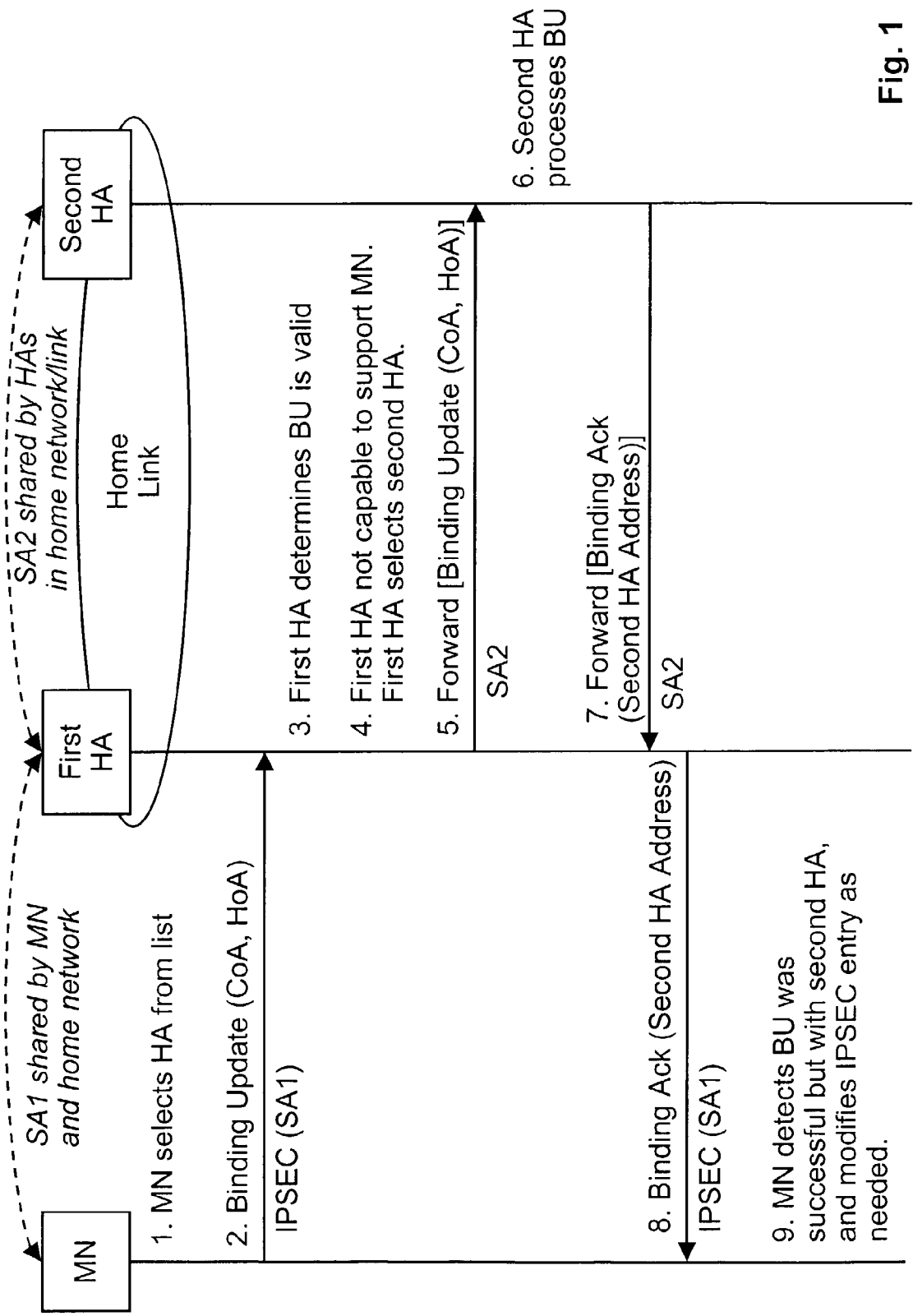
FIG. 1 shows a schematic diagram illustrating a binding update scenario with a supported binding update failure procedure according to an embodiment of the present invention.

According to the present invention, a care of address registration of a mobile node MN at a home server unit of a home network of the mobile node is performed. The home network comprises a plurality of home servers being arranged to maintain a binding between a home address of an MN and its current care of address from a visited network. For example, the care of address registration may be performed in a mobile IPv4 or mobile IPv6 environment in which a home server is represented by a home agent HA.

In case a first home server receives a binding update (BU) message from the MN and encounters a problem with the requested care of address registration, for example due to insufficient resources, a binding acknowledgment message is returned to the MN indicating that the BU has been rejected at the first home server, but providing information of a second home server, e.g. an IP address of the second home server for registration which already processes the binding update to the MN. Although the mobile IPv6 term "binding update" is used here it is noted that the present invention is applicable to other protocols than mobile IPv6. For example, in a mobile IPv4 environment the binding update message is a registration message.

According to mobile IP environment it can be assumed that if there is more than one home server in the same link or the same home link, each home server has learned each other's existence through router advertisement messages sent by each home server and announcing the services supported and preferences to serve as home servers. In particular, each home server can know if the others on the same link are available at all to support MNs.

Hence, the first home server may have an entry in its home server list for a second home server capable of supporting the MN and may select the second home server from this home server list.

In particular, before replying to the MN the first home server contacts the second home server and forwards the BU message from the MN, so that the second home server can perform the binding update and begin supporting the MN mobility. The second home server may forward the binding acknowledgment message to be sent to the MN either to the first home server or send it directly to the MN. The information about the second home server may be included in the binding acknowledgment message either at the first or the second home server also depending on whether the second home server sends the binding acknowledgment message directly to the MN or not. The same applies for the confirmation of the binding update at the second home server. As a result, the MN will not send any additional BU messages since it interprets the binding acknowledgment BA as the result of a successful BU procedure.

In terms of security aspects, the BU/BA messages exchanged between the MN and the home server are typically protected with IPSEC (IP Security) using a security association SA that the MN and the home network share and which is setup at subscription time, for example. Now, if a set of home servers is available in the home network to serve the MN, and the MN can choose each of them at different moments or due to load situation, the same security association is shared between the MN and all the home servers that the MN can use.

Alternatively, there may be a situation in which the MN has only one home server pre-configured in its list and has an SA that is valid only with the home server pre-configured, and other home servers in the home network are not aware of the SA the MN shares with the pre-configured home server. In such case, according to the invention, the first home server is enabled to transfer the SA shared with the MN to the second home server when the BU from the MN is forwarded to the second home server. In this way, the second home server will be able to verify the validity of future messages from the MN, and the MN is enabled to verify the validity of the messages from the second home server.

Moreover, according to current IPSEC specifications, a node receiving a packet retrieves the IPSEC SA to be used for that packet by using an SPI (Security Parameter Index) and a destination IP address of the packet, i.e. the address of the node receiving the packet. The use of a source address to select the SA is currently only optional. In such scenario, the second home server cannot directly send the BA back to the MN (since the MN expects the BA from the first home server and the IPSEC would not accept the packet since the source address is the one of the second home server, and therefore the SA the MN shares with the first home server cannot be used), but, according to the invention, is enabled to send it back through the first home server. Also, the MN upon receiving the BU from the first home server containing the new mobility option is enabled to modify the IPSEC entry to allow the use of the SA also for packets sent by the second home server.

In this way, only one round trip can guarantee the success of the BU. Moreover, the MN is not involved in the selection of an alternative home server.

FIG. 1 shows a schematic diagram illustrating a binding update scenario with a supported binding update failure procedure according to an embodiment of the present invention.

In step 1 an MN requesting a care of address registration in a mobile IPv6 environment selects a first home agent HA, e.g. the primary one of the local home agent list maintained in the MN. In step 2 the MN sends a BU message containing a care of address CoA and a home address HoA to the first HA applying IPSEC to the message according to an SA1 shared with the home network.

In step 3, upon receiving the BU message the first HA verifies the message, that is, it checks that it is a first HA and that the home address in the BU is an on-link address. After these tests if the first HA determines it can support the MN, it returns a BA message to the MN indicating successful registration.

However, according to step 4, if the first HA determines that it doesn't have sufficient resources to serve the MN, it selects a second HA from the list of HAs available and capable to serve the MN which list may be maintained in the first HA. In step 5, the first HA either tunnels the BU message received from the MN to the selected second HA or uses a different protocol which may be proprietary to forward such message. With the message also information about the security association SA1 shared with the MN may be transferred to the second HA. The message is protected with a security association SA2 shared by the HAs in the home network, e.g. on the same link, and setup by the home network.

In step 6 the second HA verifies that the message is coming from a legitimate HA, and trusts that the first HA has verified the validity of the BU thanks to IPSEC. The second HA processes the BU creating an entry in a binding cache. In step 7, the second HA sends a reply back to the first HA, i.e. it forwards a binding acknowledgment message to the first HA by tunneling or using another protocol. In the binding acknowledgment message the second HA has included an alternative home agent option including the IP address of the second HA.

As mentioned earlier the binding acknowledgment message can also in some circumstances be sent directly from the second HA to the MN.

In step 8 the first HA sends the BA message forwarded by the second HA to the MN by applying the IPSEC SA1. The MN receives the BA message and detects in step 9 that the first HA has rejected the BU but that a different HA has been assigned to support the MN, and that the binding cache entry has already been created. The MN therefore updates an IPSEC engine entry to accept mobile IPv6 signaling from the second HA. Alternatively, such IPSEC entry update may not be required, since the IPSEC entry may be written so that mobile IPv6 messages from any HA in the home network/link can be accepted by the IPSEC in the MN. In case the MN wants to update the whole home agent list it needs to run the home agent discovery process.

It is to be noted that the invention is not restricted to only two home servers. In case the second home server also has insufficient resources for serving the MN, then the second home server can forward the BU to a third home server. The second home server may select the third home server using the same procedure as described above. Furthermore, the same security aspects as mentioned above may be taken into account.

The present invention can be implemented in mobile IPv6 by modifying a mobile IPv6 Binding Acknowledgment message to include a new optional mobility option. Currently, optional mobility options supported by mobile IPv6 are Binding Authorization Data option and Binding Refresh Advice option. According to an embodiment of the present invention and as shown in FIG. 2, a new mobility option called Alternative Home Agent option is defined to include the address of the second HA selected to support the MN.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. A method of performing a care of address registration of a mobile node at a home server unit of a home network of the mobile node, the home network comprising a plurality of home server units being arranged to maintain a binding between a home address of a mobile node and its current care of address from a visited network, the method comprising:
   receiving a binding update message from a mobile node at a first home server unit selected by the mobile node for registration;
   deciding whether a binding update is to be rejected upon receiving the binding update message;
   if the binding update is to be rejected, selecting a second home server unit at the first home server unit, and forwarding the received binding update message to the selected second home server unit.

2. A method according to claim 1, in which the second home server unit is selected from a home server unit list maintained at the first home server unit, the home server list containing other home server units with their preferences to serve as a home server unit.

3. A method according to claim 1, further comprising:
   receiving a binding acknowledgement message from the second home server unit at the first home server unit.

4. A method according to claim 3, further comprising detecting information about the second home server unit in the binding acknowledgment message at the first home server unit.

5. A method according to claim 4, in which the information comprises an alternative home agent option including an IP address of the second home server unit.

6. A method according to claim 3, in which the binding acknowledgment message is made to comply with a security association between the mobile node and the first home server unit.

7. A method according to claim 3, further comprising sending the received binding acknowledgment message from the first home server unit to the mobile node.

8. A method according to claim 1, in which information about a security association between the mobile node and the first home server unit is included in the binding update message forwarded to the selected second home server unit.

9. A method according to claim 1, further comprising sending a binding acknowledgment message from the second home server unit directly to the mobile node.

10. A home server unit of a home network of a mobile node, the home server unit being arranged to perform a care of address registration of the mobile node, the home network comprising a plurality of home server units being arranged to maintain a binding between a home address of a mobile node and its current care of address from a visited network, the home server unit comprising:
   means for receiving a binding update message from the mobile node for registration;
   means for deciding that a binding update is to be rejected upon receipt of the binding update message;
   means for selecting a second home server unit if the binding update is to be rejected; and
   means for sending the received binding update message to the selected second home server unit.

11. A home server unit according to claim 10, wherein the means for receiving further receives a binding acknowledgement message from the selected second home server unit.

12. A home server unit according to claim 11, wherein the received binding acknowledgment message includes an alternative home agent option containing an IP address of the second home server unit.

13. A home server unit according to claim 11, in which the received binding acknowledgment message is arranged to comply with a security association between the mobile node and the first home server unit.

14. A home server unit according to claim 11, wherein the means for sending is arranged to send the received binding acknowledgment message to the mobile node.

15. A home server unit according to claim 10, further comprising means for maintaining a home server unit list containing other home server units with their preferences to serve as a home server unit, in which the means for selecting the second home server unit is arranged to select the second home server unit from the home server unit list.

16. A home server unit according to claim 10, further comprising means for including information about a security association between the mobile node and the home server unit in the binding update message sent to the selected second home server unit.

17. A mobile node being arranged to request a care of address registration at a home server unit of a home network of the mobile node, the home network comprising a plurality of home server units being arranged to maintain a binding between a home address of a mobile node and its current care of address from a visited network, the mobile node comprising:

means for selecting a first home server unit for registration;
means for sending a binding update message from the mobile node to the first home server unit;
means for receiving a binding acknowledgment message including information about a second home server unit selected by the first home server unit; and
means for recognizing successful registration with the second home server unit.

18. A mobile node according to claim 17, further comprising means for modifying a security entry to use a security association between the mobile node and the first home server unit also between the mobile node and the second home server unit.

19. A communication network comprising a plurality of mobile nodes and a plurality of home server units being arranged to maintain a binding between a home address of a mobile node and its current care of address from a visited network, in which the home server units are home server units according to claim 10 and the mobile nodes are mobile nodes according to claim 17 or 18.

20. A mobile node according to claim 17 wherein the received binding acknowledgment message is received from the first home server unit.

21. A mobile node according to claim 20, wherein the received binding acknowledgment message includes an indication of a rejection of the registration with the first home server unit.

22. A mobile node according to claim 20, further comprising means for updating a security engine entry to accept messages from the second home server unit.

23. A mobile node according to claim 17, wherein the received binding acknowledgment message is received from the second home server unit.

* * * * *

UNITED STATES PATENT AND TRADEMARK OFFICE
CERTIFICATE OF CORRECTION

| | | |
|---|---|---|
| PATENT NO. | : 7,489,667 B2 | Page 1 of 1 |
| APPLICATION NO. | : 10/290490 | |
| DATED | : February 10, 2009 | |
| INVENTOR(S) | : Stefano M. Faccin et al. | |

It is certified that error appears in the above-identified patent and that said Letters Patent is hereby corrected as shown below:

On the Title Page

Item [*] Notice: Subject to any disclaimer, the term of this patent is extended or adjusted under 35 USC 154(b) by (1,018) days Delete the phrase "by 1,018 days" and insert -- by 1,688 days --

Signed and Sealed this

Twenty-fifth Day of May, 2010

David J. Kappos
*Director of the United States Patent and Trademark Office*